United States Patent
Ogawa et al.

(10) Patent No.: US 6,346,048 B1
(45) Date of Patent: Feb. 12, 2002

(54) GAME SYSTEM, GAME MACHINE, GAME DATA DISTRIBUTION MACHINE, IMAGE DATA DISTRIBUTION SYSTEM, AND COMPUTER-USABLE INFORMATION

(75) Inventors: Toru Ogawa; Shigeru Sato, both of Tokyo; Atsushi Wachi, Yokohama; Hiroshi Nishiura, Yokohama; Akihiko Moriguchi, Yokohama, all of (JP)

(73) Assignee: Namco Ltd., Tokyo (JP)

( * ) Notice: Subject to any disclaimer, the term of this patent is extended or adjusted under 35 U.S.C. 154(b) by 0 days.

(21) Appl. No.: 09/647,356

(22) PCT Filed: Feb. 2, 2000

(86) PCT No.: PCT/JP00/00553

§ 371 Date: Dec. 5, 2000

§ 102(e) Date: Dec. 5, 2000

(30) Foreign Application Priority Data

Feb. 4, 1999 (JP) .............................. 11-026917

(51) Int. Cl.$^7$ ........................... A63F 13/12; A63F 13/00
(52) U.S. Cl. ........................................ 463/42; 463/40
(58) Field of Search .................... 463/16–22, 26, 463/27, 40, 42, 41

(56) References Cited

U.S. PATENT DOCUMENTS

| | | | |
|---|---|---|---|
| 4,570,930 A | * 2/1986 | Matheson | 273/1 |
| 4,958,835 A | * 9/1990 | Tashiro et al. | 273/85 |
| 4,998,199 A | * 3/1991 | Tashiro et al. | 364/410 |
| 5,083,800 A | * 1/1992 | Lockton | 273/439 |
| 5,580,309 A | * 12/1996 | Piechowiak et al. | 463/16 |
| 5,586,257 A | * 12/1996 | Perlaman | 463/42 |
| 5,667,440 A | * 9/1997 | Sasaki et al. | 463/29 |
| 5,816,920 A | * 10/1998 | Hanai | 463/42 |
| 5,820,463 A | * 10/1998 | O'Callaghan | 463/42 |
| 5,899,810 A | * 5/1999 | Smith | 463/42 |
| 6,042,476 A | * 3/2000 | Ohashi et al. | 463/40 |
| 6,042,477 A | * 3/2000 | Addink | 463/42 |
| 6,203,433 B1 | * 3/2001 | Kume | 463/42 |

FOREIGN PATENT DOCUMENTS

| | | |
|---|---|---|
| JP | 4-208782 | 7/1992 |
| JP | 2521409 | 5/1996 |
| JP | 8-243255 | 9/1996 |
| JP | 8-294581 | 11/1996 |
| JP | 9-270779 | 10/1997 |
| JP | 10-179934 | 7/1998 |

* cited by examiner

Primary Examiner—Jessica J. Harrison
Assistant Examiner—Alex F. R. P. Rada, II
(74) Attorney, Agent, or Firm—Oliff & Berridge, PLC (57) ABSTRACT

There are provided a game system, game machine, game data distribution machine, image data distribution system and computer available information which can synchronize clock signals between a plurality of devices.

A game data distribution machine (100) includes a machine clock generation section (180), a clock selection section (160) and a clock generation section (120). By using these sections, a reference clock is generated as a basis of synchronization. The game data distribution machine also includes a clock and data superposition section (170) which superposes the reference clock on a game data, the superposed game data being then distributed to game machines (200). Each of the game machines (200) includes a clock and data separation section (272) which extracts the reference clock from the superposed data and a clock generation section (220) which generates an operation clock for each of game execution means including a game data production section (290) and so on, based on the reference clock.

16 Claims, 8 Drawing Sheets

GAME SYSTEM, GAME MACHINE, GAME DATA DISTRIBUTION MACHINE, IMAGE DATA DISTRIBUTION SYSTEM, AND COMPUTER-USABLE INFORMATION

TECHNICAL FIELD

The present invention relates to a game system, game machine, game data distribution machine, image data distribution system and computer-usable information, which can synchronize clock signals between a plurality of machines.

BACKGROUND OF ART

Usually, each machine in a network operates in an asynchronous mode with respect to clock signals for determining its speed of executing a display of image and so on. It is thus difficult to synchronize the display of image or the like between the machines.

For example, when clock signals are not synchronized between the machines, the timing of image display will be deviated between the machines. This may provide a sense of incompatibility to a viewer when he or she simultaneously sees the screens of the machines.

Particularly, in a network type game system in which a game is performed while synchronizing between a plurality of game machines, it is important that the game machines are properly synchronized without any sense of incompatibility to players seeing the game scene.

DISCLOSURE OF INVENTION

It is therefore an object of the present invention to a game system, game machine, game data distribution machine, image data distribution system and computer-usable information, which can synchronize clock signals between a plurality of machines without an unpleasantness to players.

(1) To this end, the present invention provides a game system comprising at least one slave machine and a master machine connected to the slave machine through a transmission path, synchronization between the master machine and the slave machine being taken during operation, wherein the master machine includes:

means for generating a reference clock to be a basis of the synchronization; and means for transmitting the generated reference clock to the slave machine, wherein the slave machine includes:

means for receiving the reference clock transmitted from the master machine;

operation clock generation means for generating a slave operation clock for the slave machine so that the slave operation clock is synchronized with a master operation clock for the master machine based on the received reference clock; and game means for executing a game based on the generated slave operation clock.

(2) The present invention also provides an image data distribution system comprising at least one image display machine and an image distribution machine connected to the image display machine through a transmission path, the image distribution machine distributing image data to the image display machine, synchronization between the image display machine and the image distribution machine being taken during operation, wherein the image distribution machine includes:

means for generating a reference clock to be a basis of the synchronization; and means for transmitting the generated reference clock to the image display machine, wherein the image display machine includes:

means for receiving the reference clock transmitted from the image distribution machine; and operation clock generation means for generating a display operation clock for the image display machine so that the display operation clock is synchronized with a distribution operation clock for the image distribution machine based on the received reference clock.

(3) The present invention further provides a game data distribution machine for distributing game data for playing a game to a plurality of game machines in which the game is played while a progressing state of the game in each of the game machines is synchronous each other, the game data distribution machine comprising:

means for generating the game data;

means for generating a reference clock to be a basis of generation speed of the game data; and means for transmitting the reference clock and the game data to the plurality of game machines, wherein, in each of the plurality of game machines, execution speed of a game is adjusted based on the reference clock and the game is played at the execution speed of the game based on the game data.

(4) The present invention further provides a game machine for playing a game with at least one other game machine while a processing state of the game in the game machine is synchronous with a processing state of the game in the other game machine, the game machine comprising:

means for receiving game data from a game data distribution machine for distributing the game data to the game machine and to the other game machine, and a reference clock to be a basis of clock speed from the game data distribution machine;

means for generating an operation clock of the game machine so that a clock speed of the game machine is synchronized with a clock speed of the other game machine based on the received reference clock; and means for executing the game based on the generated operation clock and the game data.

(5) The present invention further provides a game machine realizing at least one of a master function and a slave function and operating in synchronization with at least one other game machine, the game machine comprising:

means for generating a reference clock to be a basis of the synchronization when the game machine realizes the master function;

means for transmitting the generated reference clock to the other game machine having the slave function when the game machine realizes the master function;

means for receiving the reference clock from the other game machine having the master function when the game machine realizes the slave function;

operation clock generation means for generating an operation clock based on the reference clock; and game means for executing the game based on the generated operation clock.

(6) The present invention further provides a game machine realizing at least one of a master function and a slave function and operating in synchronization with at least one other game machine, the game machine comprising:

circuit for generating a reference clock to be a basis of the synchronization when the game machine realizes the master function;

circuit for transmitting the generated reference clock to the other game machine having the slave function when the game machine realizes the master function;

circuit for receiving the reference clock from the other game machine having the master function when the game machine realizes the slave function;

operation clock generating circuit for generating an operation clock based on the reference clock; and game circuit for executing the game based on the generated operation clock.

(7) The present invention further provides computer-usable information embodied on an information storage medium or a carrier wave, for distributing game data for playing a game to a plurality of game machines while a progressing state of the game in each of the game machines is synchronous each other, the information comprising information for realizing:

means for generating the game data;

means for generating a reference clock to be a basis of generation speed of the game data; and means for causing transmission means to transmit the reference clock and the game data to the plurality of game machines, wherein, in each of the plurality of game machines, execution speed of a game is adjusted based on the reference clock, and the game is played at the execution speed of the game based on the game data.

(8) The present invention further provides computer-usable information embodied on an information storage medium or in a carrier wave, for a computer playing a game with at least one game machine while a progressing state of the game in the computer is synchronous with a progressing state of the game in the game machine, the information comprising information for realizing:

means for causing receiving means to receive game data distributed from a game data distribution machine distributing the game data to the game machine for playing the game, and a reference clock to be a basis of clock speed;

means for generating an operation clock of the computer so that a clock speed of the computer which uses the computer-usable information is synchronized with a clock speed of the game machine based on the received reference clock; and means for executing the game based on the generated operation clock and the game data.

(9) The present invention further provides computer-usable information embodied on an information storage medium or in a carrier wave, for a computer realizing at least one of a master function and a slave function and operating in synchronization with at least one game machine, the information comprising information for realizing:

means for generating a reference clock to be a basis of the synchronization when the computer realizes the master function;

means for causing transmission means to transmit the generated reference clock to the game machine having the slave function when the computer realizes the master function;

means for causing receiving means to receive the reference clock sent from the game machine having the master function when the computer realizes the slave functions operation clock generation means for generating an operation clock based on the reference clock; and game means for executing the game based on the generated operation clock.

According to the present invention, the master and slave machines can be operated based on a single reference clock by transmitting the reference clock to the slave machine. Thus, the basis of speed can be unified. As a result, the appropriate synchronization can be accomplished between the master and slave machines or between the slave machines. Particularly, when the present invention is applied to a game system, the appropriate synchronization can be attained between game machines with respect to display of game images, production of game sounds and so on. This can provide a sense of compatibility to players so that they can enjoy smooth operation of a network type game.

The term "clock" herein indicates a clock signal used as a basis of operating speed in various components of the machine. The term "operation clock" herein represents a clock signal which will be generated based on the clock in each of the machine components. A further clock used to synchronize various devices in the network is called "reference clock".

The respective components of the machine can synchronously be operated by synchronizing the clock. In such a manner, the game machine will be synchronized by one another with respect to the display of game images, production of game sounds and so on, such that they can also appropriately be synchronized by one another.

The reference clock is preferably of such a frequency that it can easily be transmitted. By using such a frequency, the necessary transfer bandwidth can be reduced.

It is to be noted that the game data includes at least one of game image data for display the game images and game sound data for producing the game sounds.

(10) The present invention further provides a game machine usable in a network to which a plurality of game machines are connected through a transmission path designed to transmit data with a predetermined transmission interval, the game machine operating in synchronization with at least one other game machine, the game machine comprising:

means for receiving game data for playing a game, with the transmission interval;

means for generating an operation clock based on the transmission interval; and means for executing the game based on the generated operation clock and the game data.

(11) The present invention further provides computer-usable information embodied on an information storage medium or in a carrier wave, being used in a network to which a computer and at least one game machine are connected through a transmission path designed to transmit data with a predetermined transmission interval, and for synchronizing with the game machine, the information comprising information for realizing:

means for causing receiving means to receive game data for playing a game, with the transmission interval;

means for generating an operation clock based on the transmission interval; and means for executing the game based on the generated operation clock and the game data.

According to the present invention, when the transmission of data is to be performed with a constant interval, time component used as a basis of synchronization is generated by the use of the interval. Based on such a time component, the operation clock can be generated to determine a basis of operating speed.

When such a system is taken by all the processing devices connected to the network, only a single basis of operating speed can be established throughout all the processing devices. Thus, all the processing devices can exactly be synchronized.

It is to be noted herein that the other game machine is part or all of the plurality of game machines and that the other processing device is part or all of the plurality of processing devices.

(12) It is preferable that the reference clock is set to be of a frequency lower than the operation clock, the game means includes a plurality of game execution means, and the operation clock generation means generates the operation clock for each of the game execution means.

Thus, the necessary transmission band can be reduced in comparison with the transmission of a clock having the same frequency as the operation clock. Even when the reference clock is to be transmitted, its affection can be minimized with respect to the normal transmission of game data.

(13) It is further preferable that the game machine realizes the master function when the game machine starts prior to the other game machine, and realizes the slave function when the game machine starts after the other game machine.

Thus, even if a number of game machines are gradually increased, the appropriate synchronization can be accomplished between the game machines since the first started game machine functions as a master machine

BEST MODE FOR CARRYING OUT THE INVENTION

Several preferred embodiment of the present invention will now be described with reference to the drawings.

(First Embodiment)

Figure 1:
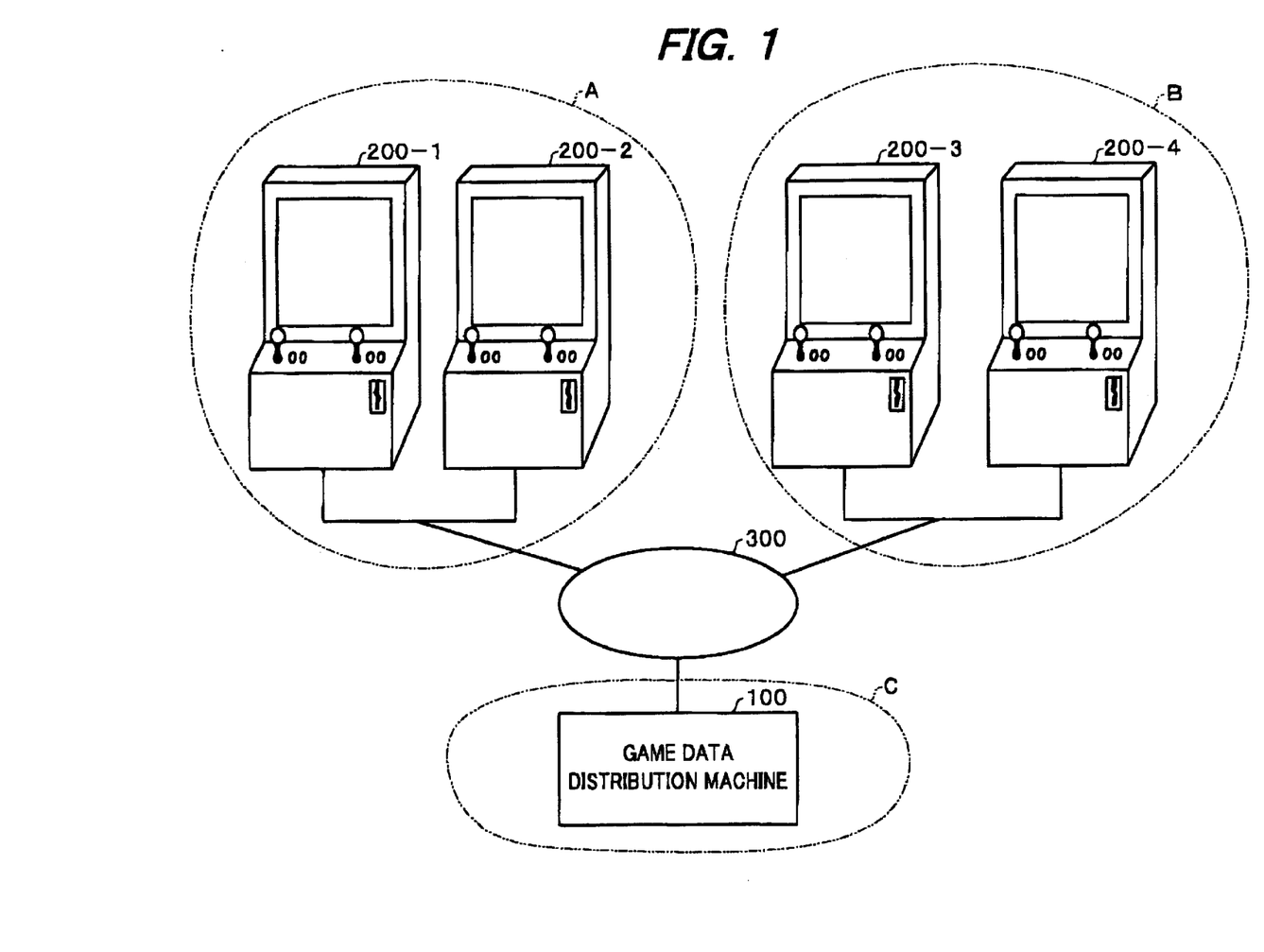
FIG. 1 is a view of a game system constructed according to one embodiment of the present invention.

First of all, the present invention will be described in connection with a game system comprising a game data distribution machine having a master function and functioning as a master machine and a plurality of game machines each having a slave function depending on the master machine and functioning as a slave machine, the game data distribution machine being connected to the plurality of game machines through a network including a transmission path, wherein a game is executed in real time while synchronizing images between processing devices FIG. 1 is a game system constructed according to the first embodiment of the present invention.

This system comprises a site A in which game machines 200-1 and 200-2 exist, a site B in which game machines 200-2 and 200-4 exist and a site C in which a game data distribution machine 100 exist. These sites are interconnected through an ATM (Asynchronous Transfer Mode) network including a transmission or communication line 300.

Game data from the game data distribution machine 100 are transmitted to the respective game machines 200-1 through 200-4 wherein a network type multi-player game will be executed. The game data contain at least one of game image data for displaying the game images and game sound data for producing the game sounds.

In such a network type multi-player game systems it is required that the game image is displayed in synchronous with the situation of game advance between the game machines 200-1 through 200-4 such that the game will be executed in real time in the respective one of the game machines 200-1 through 200-4.

For example, for a racing game, when the speed of image display is different from one game machine to another, game players will feel a sense of incompatibility since the goal time may be different from one player to another even though two players have finished.

In order to display the game image synchronized with the situation of game advance, it is necessary to synchronize an operation clock for determining the speed of game image display between the game machines 200-1 through 200-4.

A technique of synchronizing the clock may be considered in which the clock itself in the master machine is transmitted to the slave machine(s) such that the slave machine(s) will be synchronized with the master machine. However, since the clock itself is of high frequency and the clock must always be transmitted to the slave machine(s) to maintain the same speed, the application of such a technique requires to ensure a sufficient transmission band. The present status of art cannot provide such a sufficient transmission band.

To avoid such a problem, the first embodiment of the present invention takes a technique of transmitting a reference clock having its frequency set to be lower than that of the actual operation clock from the game data distribution machine 100 being a master machine to the respective one of the game machines 200-1 through 200-4 which are slave machines. Each of the game machines 200-1 through 200-4 will adjust the actual operation clock based on the reference clock.

In the first embodiment, the term "clock" herein indicates a clock signal usable as a basis of operating speed in each of the game machine components. The term "operation clock" herein represents a clock signal generated based on the aforementioned clock for each of the game machine components. Particularly, a clock for synchronizing the game machines in the network is called "reference clock".

Figure 2:
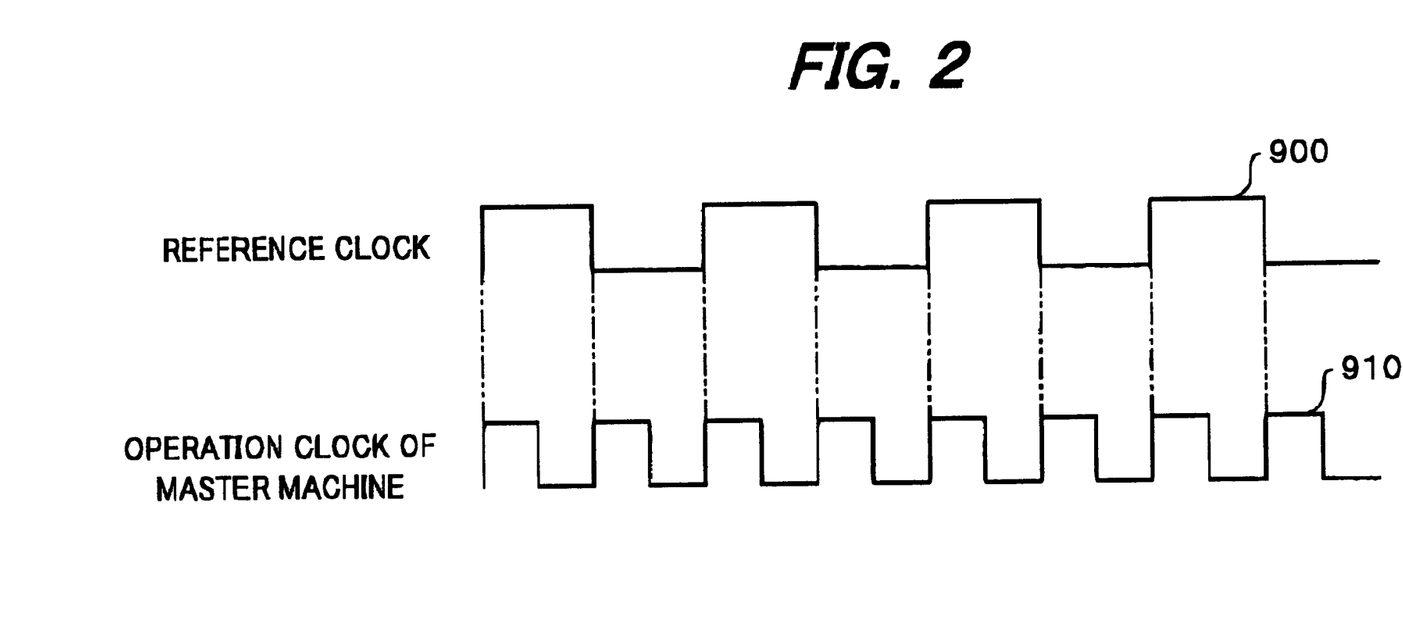
FIG. 2 is a view illustrating clocks used in the embodiment of the present invention.

FIG. 2 exemplifies clocks used in the first embodiment.

A reference clock 900 is preferably of a frequency for easy transmission. In the first embodiment, the reference clock 900 has been adjusted to be set at a lower frequency, that is, a frequency equal to one-half frequency of the actual operation clock 910.

When the speed of clock to be transmitted is lowered in such a manners the necessary transmission band may be reduced to transmit the clock smoothly. The synchronization at the reference clock 900 will now be described.

Figure 3:
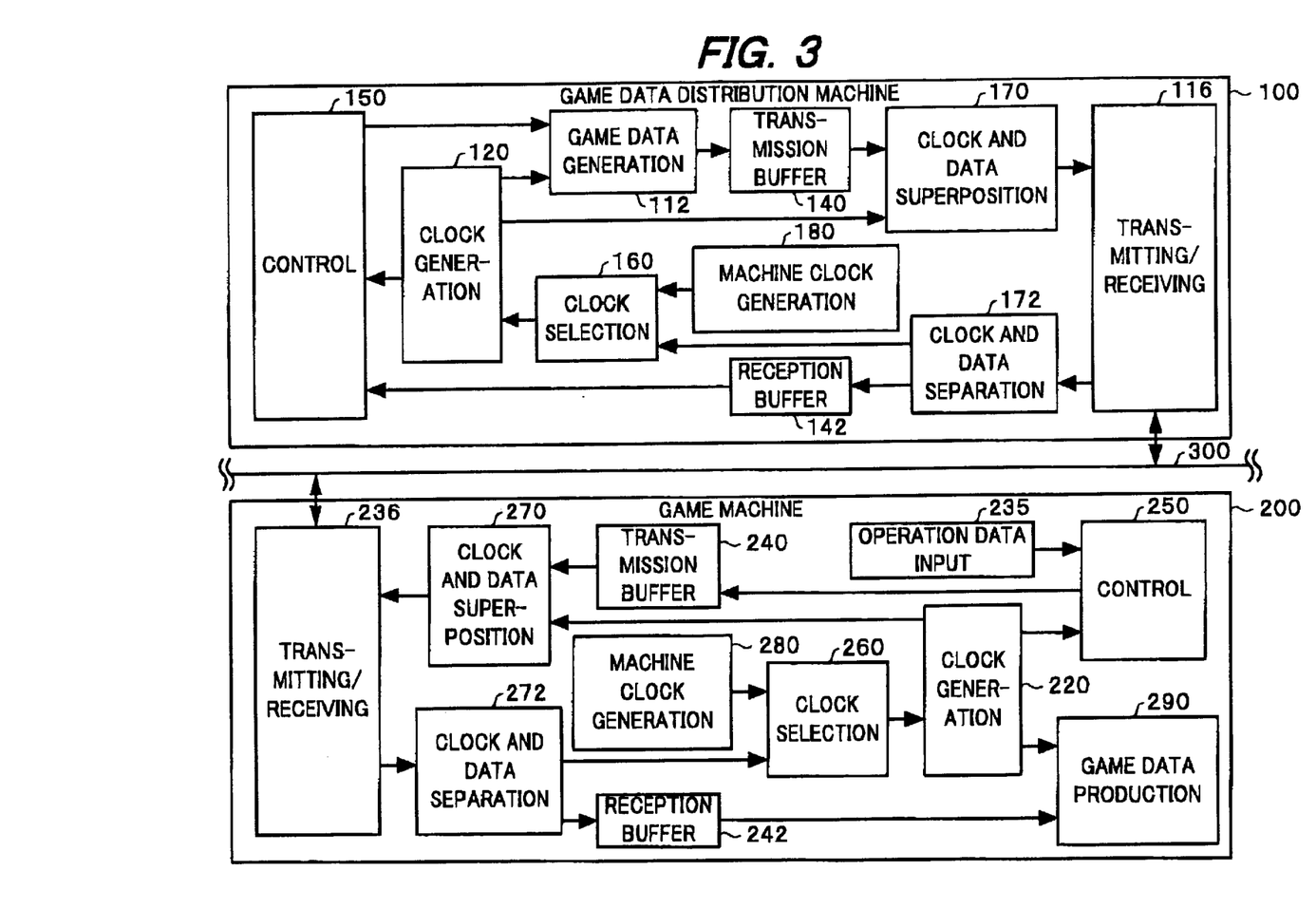
FIG. 3 is a functional block diagram of a game data distribution machine and game machine which are constructed according to one embodiment of the present invention.

FIG. 3 is a functional block diagram illustrating the power supply circuit 100 and game machines 200 which are constructed according to the first embodiment of the present invention.

The game data distribution machine 100 comprises a transmitting/receiving section 116 for receiving distribution request data from a game machine 200 and for transmitting distribution data containing game data and reference clock 900 to the game machine 200 that requested the distribution data, and a game data generation section 112 for generating game data used to produce game images and sounds based an the received distribution request data.

The game data distribution machine 100 also comprises a machine clock generation section 180 for generating a machine clock, a clock selection section 160 using the machine clock as the reference clock 900, and a clock generation section 120 for generating an operation clock 910 used to determine the operating speed depending on and for each game execution means including the game data generation section 112 and so on, based on the reference clock 900.

The game data distribution machine 100 further comprises a control section 150 for controlling the transfer of various data, a clock and data separation section 172 for separating the operational data of the player from the received distribution request data, a reception buffer 142, a transmission buffer 140, and a clock and data superposition section 170 for superposing the reference clock 900 from the clock generation section 120 on the game data transmitted from the game data generation section 112 through the transmission buffer 140.

On the other hand, the game machine 200 for displaying the game images and for producing the game sounds comprises an operation data input section 235 for receiving the input of the game player, a control section 250 for transferring the operation data through the transmission buffer 240, a clock and data superposition section 270 for taking the operation data from the transmission buffer 240 as distribution request data, and a transmitting/receiving section 236 for transmitting the distribution request data from the clock and data superposition section 270 to the game data distribution machine 100 and for receiving the distribution data from the game data distribution machine 100.

The game machine 200 also comprises a clock and data separation section 272 for separating the reference clock 900 and the game data from the received distribution data, and a game data production section 290 for displaying the game images and producing the game sounds based on the game data from the clock and data separation section 272 through the reception buffer 242.

The game machine 200 further comprises a clock generation section 220 for generating the operation. clock depending on and for each game execution means including the game data production section 290 and so on, based on the reference clock 900 separated by the clock and data separation section 272.

If it is desired that the game data distribution machine 100 also has the slave function, the game machine 200 also having the master function, the game data distribution machine 100 and game machine 200 being capable of having both the master and slave functions, the following configuration may be adopted.

As shown in FIG. 3, the clock selection section 160 in the game data distribution machine 100 may be configured so that it selects either of the received reference clock 900 or machine clock, the selected clock being used as the reference clock 900.

Alternatively, the game machine 200 may also comprise a machine clock generation section 280 and a clock selection section 260. The clock selection section 260 may select either of the machine clock or received reference clock 900, the selected clock being used as the reference clock 900. In such a case, the clock and data superposition section 270 superposes the distribution request data on the reference clock 900 while the game data distribution machine 100 receiving the reference clock 900 separates the reference clock 900 from the distribution request data by the use of the clock and data separation section 172.

The operation of each of these sections will be described below.

Figure 4A:
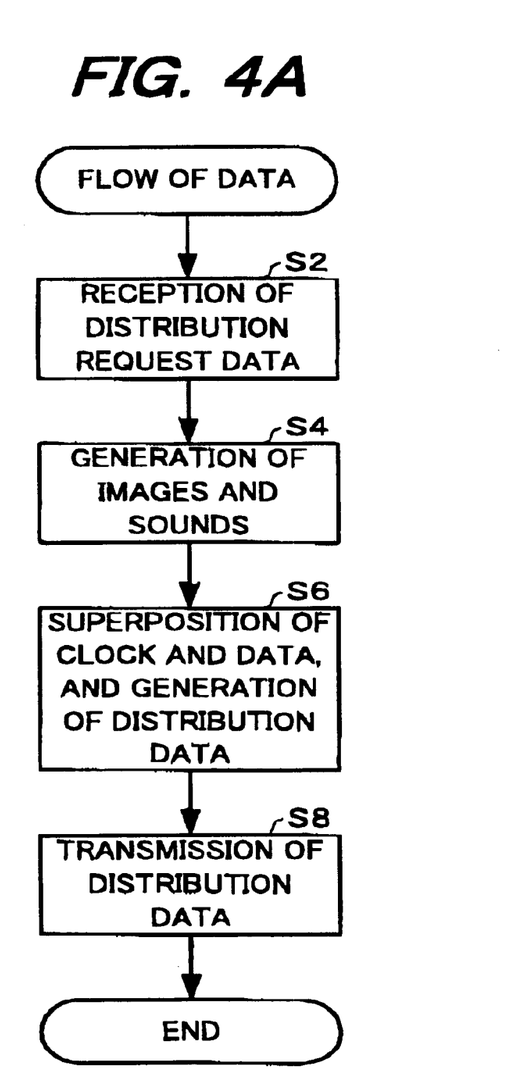
FIG. 4A is a flowchart illustrating the flow of data processing in the game data distribution machine.
Figure 4B:
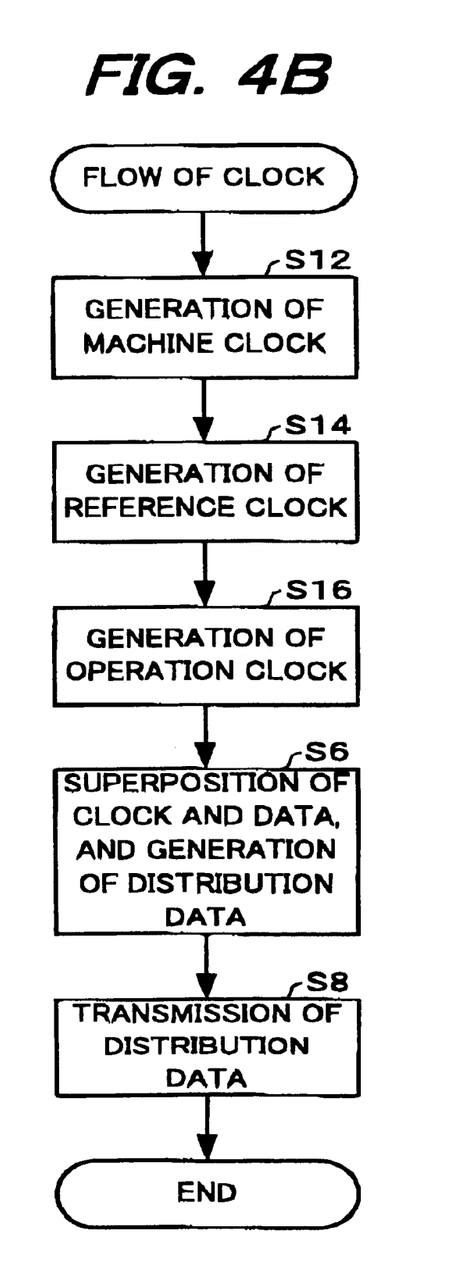
FIG. 4B is a flowchart illustrating the flow of clock processing in the game data distribution machine.

FIG. 4A shows a flowchart illustrating the flow of data processing in the game data distribution machine 100 while FIG. 4B is a flowchart illustrating the flow of clock processing in the game data distribution machine 100.

As shown in FIG. 4A, the transmitting/receiving section 116 first receives the distribution request data from the game machine 200 (step S2). The game data distribution machine 100 then causes the clock and data separation section 172 to separate the operation data from the distribution request data.

The control section 150 then transfers the separated operation data through the reception buffer 142 to the game data generation section 112 wherein a game data is generated (step S4).

The game data generation section 112 transfers the generated game data through the transmission buffer 140 to the clock and data superposition section 170 wherein the game data is superposed on the clock to generate a distribution data (step S6).

The transmitting/receiving section 116 then transmits the generated distribution data to the game machine 200 (step S8).

The flow of clock processing will now be described in connection with FIG. 4B.

First of all, the machine clock generation section 180 generates a machine clock (step S12). The clock selection section 160 selects this machine clock as the reference clock 900 (step S14).

The generation of the machine clock is because when the reference clock 900 is fed from the other processing device, the clock selection section 160 may selectively handle the machine clock as the reference clock 900 or directly the reference clock 900 fed from the other processing device, depending on whether the machine operates as a master or slave.

As the clock selection section 160 generates the reference clock 900 (step S14), the clock generation section 120 generates an operation clock 910 based on the reference clock 900 (step S16).

This operation clock 910 is of a frequency several times higher than that of the reference clock 900 and will be generated to have frequencies different from one another for the respective game execution means defining a game means for performing the game.

The clock generation section 120 transfers the reference clock 900 to the clock and data superposition section 170 wherein the reference clock is superposed on the game data to generate a distribution data (step S6).

The generated distribution data is transmitted to the game machine 200 through the transmitting/receiving section 116 (step S8).

Although the flow of processing has been described in connection with the game data distribution machine 100, the flow of processing in the game machine 200 will now be described below.

Figure 5A:
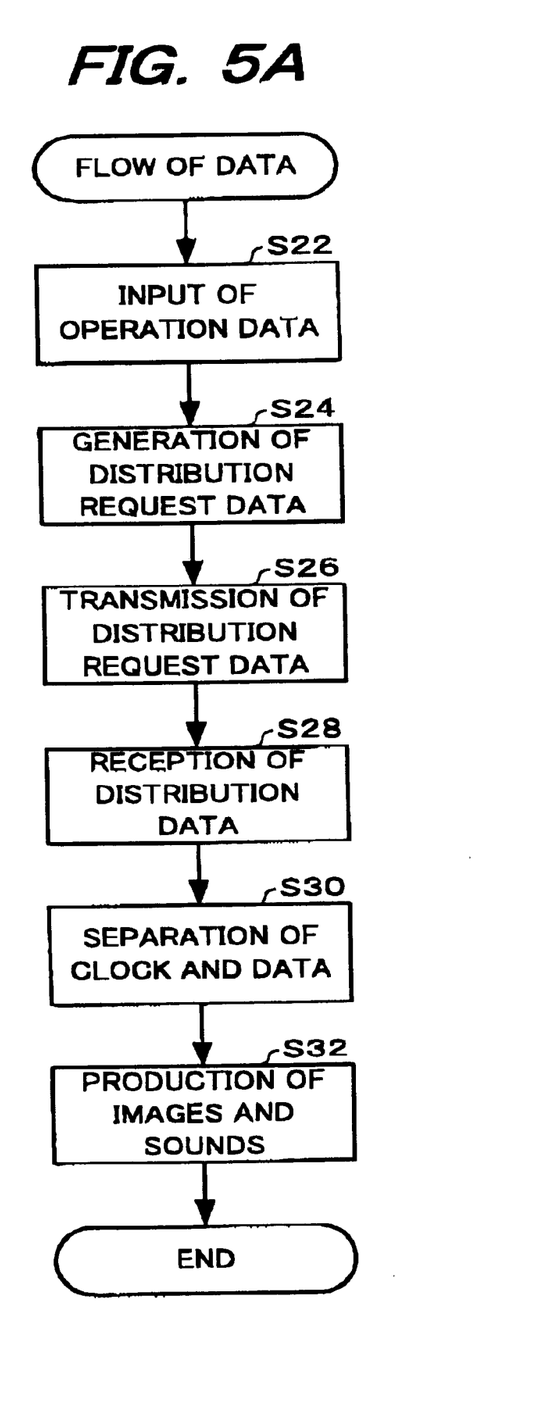
FIG. 5A is a flowchart illustrating the flow of data processing in the game machine.
Figure 5B:
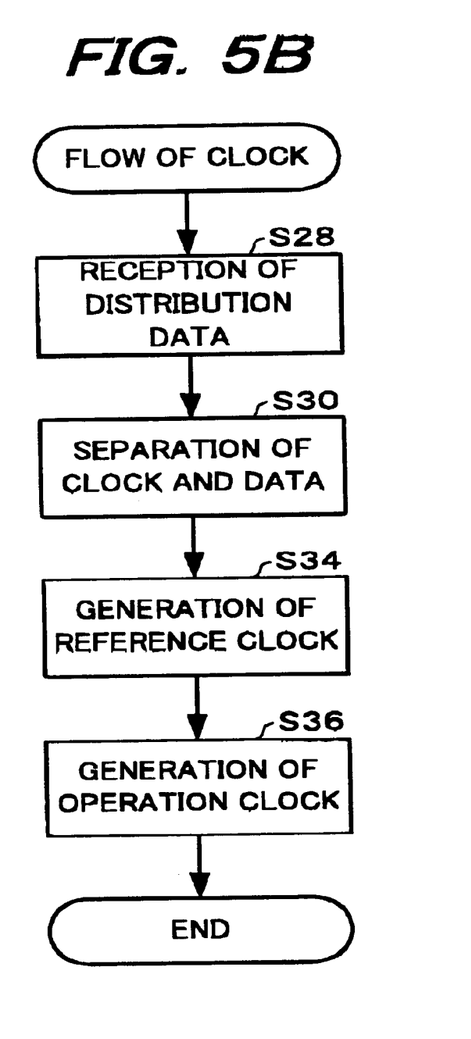
FIG. 5B is a flowchart illustrating the flow of clock processing in the game machine.

FIG. 5A is a flowchart illustrating the flow of data processing in the game machine 200 while FIG. 5B is a flowchart illustrating the flow of clock processing in the game machine 200.

The game machine 200 inputs the player's operation data into the operation data input section 235 (step S22). The control section 250 feeds the operation data to the clock and data superposition section 270 through the transmission buffer 240.

The clock and data superposition section 270 generates a distribution request data including the operation data (step S24) and then transfers it to the transmitting/receiving section 236.

The transmitting/receiving section 236 transmits the distribution request data to the game data distribution machine 100 (step S26).

After received the distribution request data, the game machine 200 receives the distribution data including the game data and reference clock 900 from the game data distribution machine 100 through the communication line 300 via the transmitting/receiving section 236 (step S28).

The distribution data is separated into the reference clock 900 and game data by the clock and data separation section 272 (step S30).

The separated game data is transferred from the clock and data separation section 272 through the reception buffer 242 to the game data production section 290 wherein it is produced as game image or game sound (step S32).

Referring now to FIG. 5B, the flow of clock processing in the game machine 200 will be described below.

The reception of distribution data (step S28) and the separation of clock and data (step S30) are as described above.

The separated reference clock 900 is transferred to or generated by the clock generation section 220 (step S34).

The frequency of the reference clock 900 is multiplied several times by the clock generation section 220 and used to generate an operation clock used to determine the operating speed for each of the game execution means (step S36).

In the first embodiment, thus, only a single reference clock 900 will be used in the respective processing devices (which include the game data distribution machine 100 and game machines 200) entering the network. Thus, the clock frequencies become uniform for each processing device.

When the speed of game image in one game machine 200 is different from that of the other game machines 200, the display of game scene will depart between the game machines 200. This does not cause the players to enjoy the network game in real time.

The speed of scene display is determined by the operation clock. Therefore, when each of the game machines 200 adjusts the operation clock based on the reference clock 900 from the game data distribution machine functioning as the maser device, the operation clocks in the game data production sections 290 of the game machines 200 can exactly be synchronized with one another to provide a proper timing of scene display.

Thus, the exact synchronization relating to the display of game images and the production of game sounds can be realized such that the players can enjoy smooth operation of the network type game in real time.

The reference clock 900 to be transmitted is set to be of a frequency lower than that of the operation clock 910. This can reduce the necessary transmission band. Even though the reference clock 900 is superposed on the game data, it will not constrain the transmission band in the communication line 300 so that the amount of game data included in the distribution data can sufficiently be ensured without adverse influence to the real time property.

Although the embodiment has been described as to the game data distribution machine 100 having the master function, the game machine 200 may have both the master and slave functions.

Figure 8:
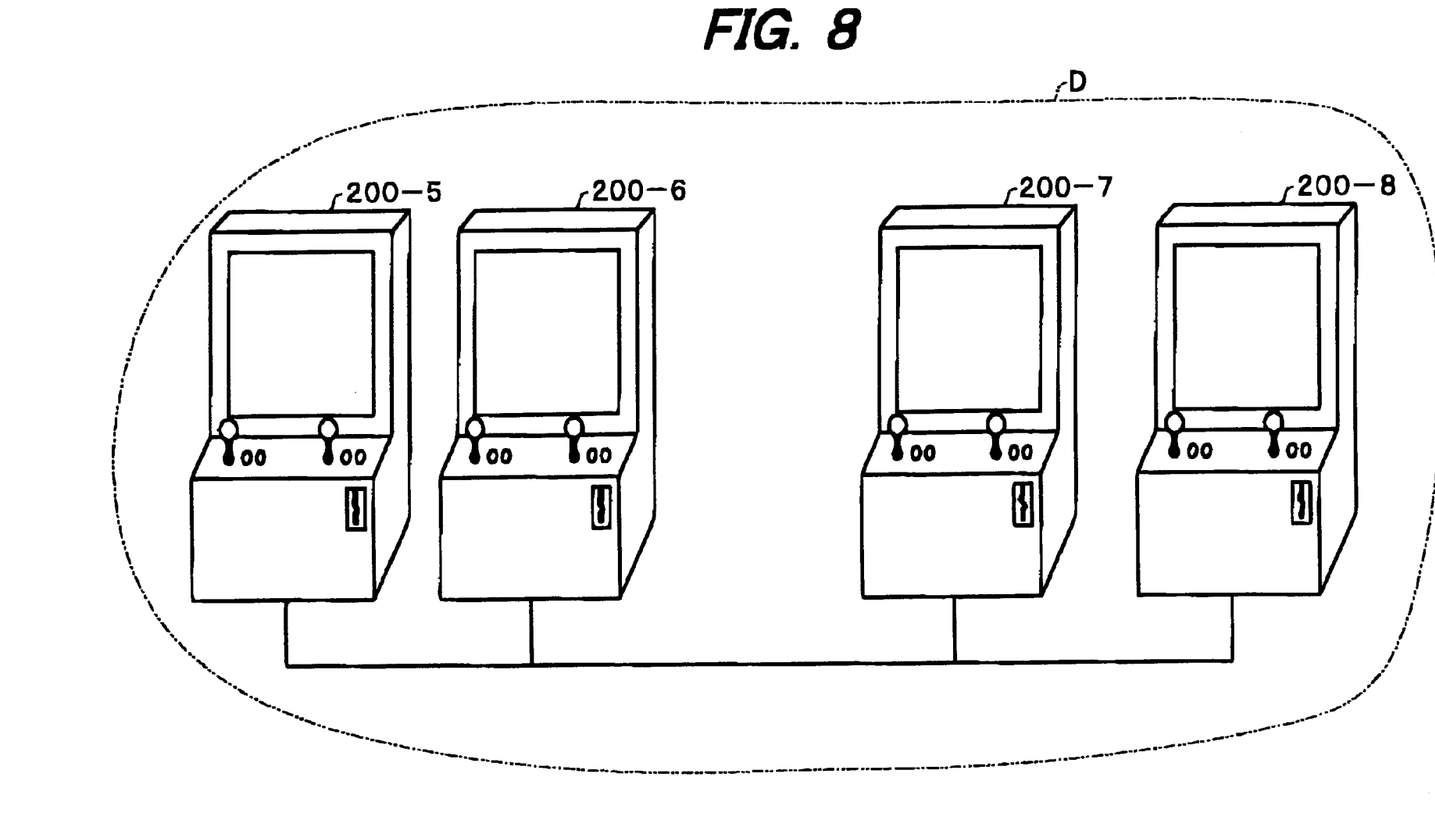
FIG. 8 is a view illustrating a game system in which a game is executed while synchronizing a plurality of game machines on the same site.

FIG. 8 is a schematic view of a game site to which a plurality of game machines 200 are connected.

Referring to FIG. 8, the technique according to the first embodiment can also effectively be used in the game site D for a network form wherein a game is executed by four game machines 200-5 through 200-8 in synchronization with one another.

In such a case, each of the game machines 200-5 through 200-8 may comprise a clock and data superposition section 270, a clock and data separation section 272, a machine clock generation section 280, a clock selection section 260 and other sections as shown in FIG. 3. Thus, each game machine 200 can function as a master or as a slave.

Accordingly, a general-purpose game system can more effectively be realized even though the number of game machines 200 is to be increased. A technique of determining a game machine 200 having the master function may be realized by any of the conventional techniques. For example, when a game machine 200 is initially powered on, that game machine 200 may be used as a master machine.

(Second Embodiment)

Although the first embodiment is essential to have the master function, the game machines 200 only having the slave function may be synchronized according to the present invention.

For example, when a plurality of game machines 200 are connected to a network through a transmission path that is configured to transmit data with a predetermined transmission interval, the game machines 200 connected to the network can be synchronized with one another in the following arrangement.

Each of the game machines 200 comprises a receiving section for receiving game data for executing a game with the transmission interval, an operation clock generation section for generating an operation clock based on the transmission interval and a game data production section used as game execution means for executing the game based on the generated operation clock.

More particularly, for example, the aforementioned distribution data can sequentially be transmitted as a frame of 125 microseconds by using a multiplexing technique based on B-ISDN (Broadband aspects of Integrated service Digital Network).

A side receiving this frame, that is, another game machine 200 receives data at a time interval of 125 microseconds. When all the game machines 200 on the network are to generate operation clocks based on the transmission interval or a timing of receiving the distribution data, only a single time basis can be shared by all the game machines 200 as in the technique using the reference clock 900 of the first embodiment.

In such a manner, the operating speeds in the processing devices interconnected through the network can exactly be synchronized with one another. For example, the speed of game image display or the like can exactly be synchronized between the processing devices such that the players can enjoy smooth operation of the network type game.

(Third Embodiment)

Although the present invention has been described as to the game machines and others for executing the network game, the functions in these game machines may be realized using an information storage medium.

Figure 6:
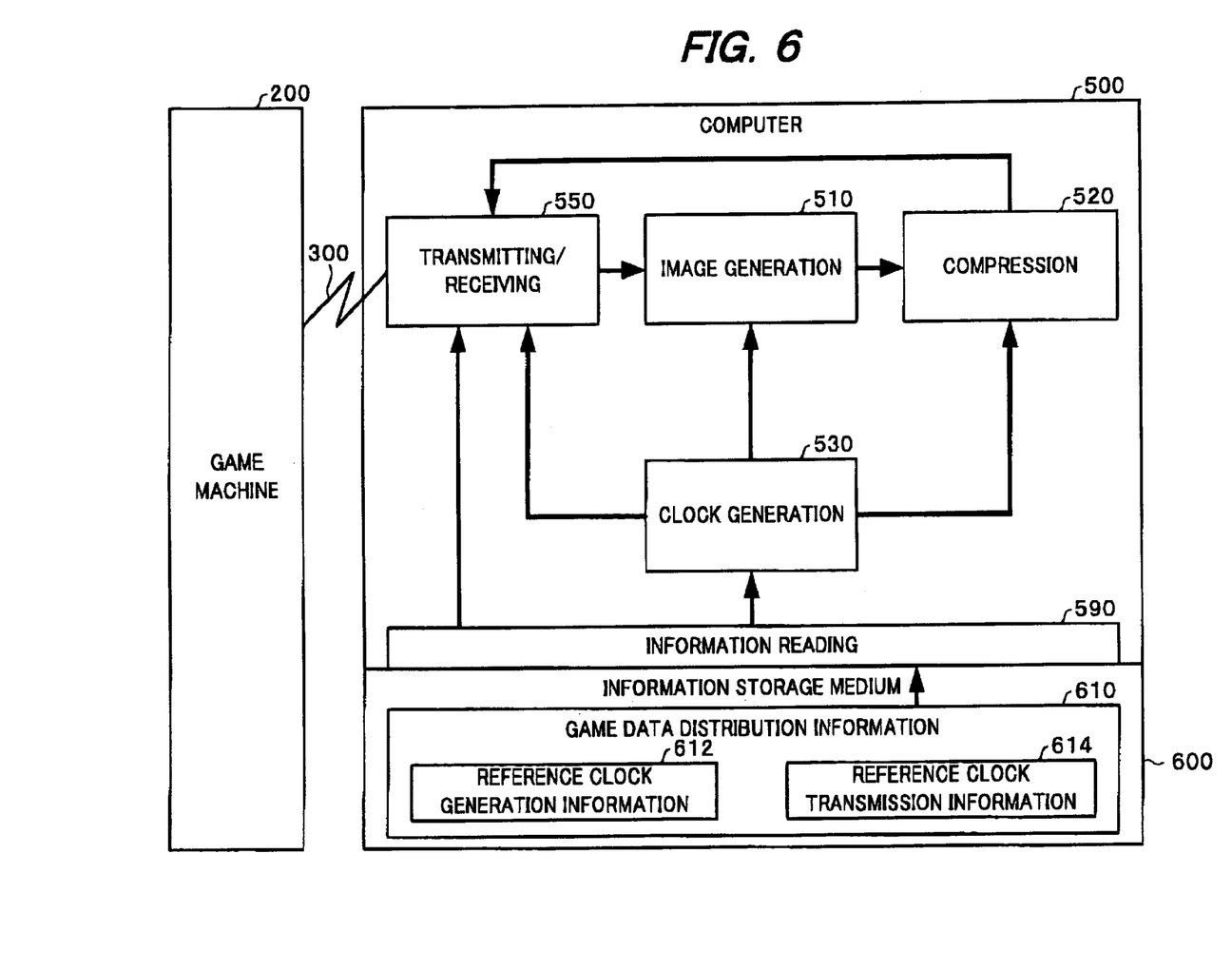
FIG. 6 is a functional block diagram of a computer and information storage medium for realizing the function of the game data distribution machine.

FIG. 6 is a functional block diagram illustrating a computer 500 functioning as a game data distribution machine 100 and an information storage medium 600.

The computer 500 comprises an image generation section 510 for generating game image data for displaying game images based on a distribution request data transmitted from a game machine 200 through a communication line 300 being a transmission path, a compression section 520 for compressing the generated game image data, a clock generation section 530 for generating a clock 910 for determining the operating speed in the image generation section 510 and others, and a transmitting/receiving section 550 for receiving the distribution request data and transmitting the game image data and other data.

The computer 500 also comprises an information reading section 590 for reading information from the information storage medium 600.

The information storage medium 600 includes a synchronization information 610 for distributing the game image data and other data. The synchronization information 610 includes reference clock generation information 612 for realizing means for generating a reference clock 900 used as a basis of clock speed for determining the generation speed of the game image data, and reference clock transmission information 614 for realizing means for causing the transmitting/receiving section 550 to transmit the reference clock 900 and the game image data toward the game machine 200.

The operation of the information storage medium 600 when it is connected to the information reading section 590 of the computer 500 will be described below.

As the information storage medium 600 is connected to the information reading section 590 of the computer 500, the reference clock generation information 612 and reference clock transmission information 614 are read by the computer 500.

As the reference clock generation information 612 is read, the clock generation section 530 functions in the same manner as in the clock generation section 120 of FIG. 3.

And, the reference clock transmission information 614 is read, the transmitting/receiving section 550 functions in the same manner as in the transmitting/receiving section 116 of FIG. 3.

Thus, the computer 500 can generate the reference clock 900 and transmit it to the game machine 200, thereby realizing the same function as in the aforementioned game data distribution machine 100.

Figure 7:
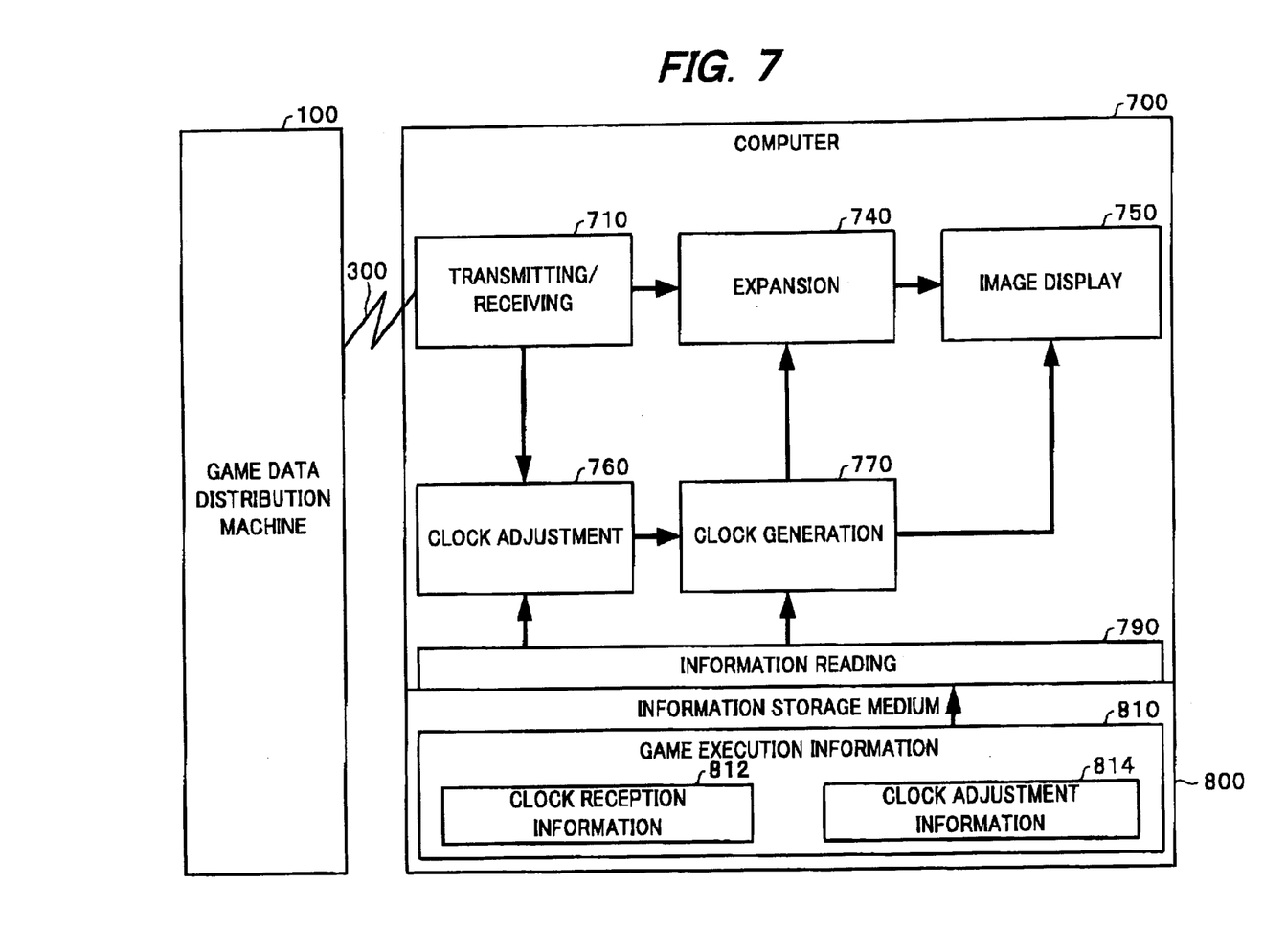
FIG. 7 is a functional block diagram of a computer and information storage medium for realizing the function of the game machine.

Next, a computer 700 functioning as one of the aforementioned game machines 200 and an information storage medium 800 will be described.

FIG. 7 is a functional block diagram illustrating the computer 700 and information storage medium 800 when they realize the function of the game machine.

The computer 700 comprises a transmitting/receiving section 710 for transmitting a distribution request data and other data to a game data distribution machine 100 for distributing game image data used for executing a game toward a plurality of game machines through a communication line 300 and for receiving the compressed game image data and other data from the game data distribution machine 100, an expansion section 740 for expanding the game image data, and an image display section 750 for displaying the expanded game image.

The computer 700 also comprises a clock generation section 770 for generating an operation clock used to determine the operating speed in a plurality of game execution means for performing the image display and others, a clock adjustment section 760 for adjusting the clock speed in the generated operation clock, and an information reading section 790 for reading information from the information storage medium 800.

On the other hand, the Information storage medium 800 includes game execution information 810 for executing a game. The game execution information 810 includes clock reception information 812 for realizing means for causing the transmitting/receiving section 710 to receive the game image data from the game data distribution machine 100 and to receive the reference clock 900 as a basis of clock speed from the game data distribution machine 100, and clock regulation information 814 for realizing means for generating the operation clock of the computer 700 to synchronize the clock speed in the computer 700 with that of the game machines based on the received reference clock 900.

Next, the operation of the information storage medium 800 connected to the information reading section 790 of the computer 700 will be described below.

As the information storage medium 800 is connected to the information reading section 790 of the computer 700, the clock reception information 812 and clock regulation information 814 are read in the computer 700.

As the clock reception information 812 is read in, the transmitting/receiving section 710 is ready for receiving the reference clock 900 in addition to the game image data.

As the clock regulation information 814 is read in, the clock adjustment section 760 is ready for adjusting the speed of game execution for each game execution means including the image display section 750 and other sections based on the reference clock 900.

The reference clock 900 is of a frequency lower than that of the operation clock 910 in the game data distribution machine 100, as described.

For this reason, the reference clock 900 and game image data can smoothly be transmitted without constraint of the transmission band, in comparison with the transmission of the operation clock 910 itself for the game data distribution machine 100 functioning as the maser device.

In such a manner, the same functions as in the aforementioned game machines 200 can be realize by the computer 700 functioning the transmitting/receiving section 710 in the same manner as in the transmitting/receiving section 236 and also functioning the clock adjustment section 760 in the same manner as in the clock generation section 220.

In place of the information storage media 600 and 800, it may be possible that the functions of the game data distribution machine and game machines 100, 200 are realized by reading information transmitted from a host device or the like. In other words, the information stored in the information storage media 600, 800 may be embodied in carrier wave.

Although the game data distribution machine 100 and game machines 200 according to the first embodiment have been described in connection with the technique realized by using the information storage media 600, 800, the game machines 200 according to the second embodiment can similarly be realized by using the information storage medium.

For example, the computer-readable information storage medium stored information for synchronizing with at least one game machine may be used in a network comprising a computer and at least one game machine connected thereto through a transmission path constructed to transmit data with a predetermined transmission interval.

The information includes information for realizing means for causing receiving means to receive game data for executing a game with the transmission interval, means for generating an operation clock based on the transmission interval, and means for executing the game based on the generated operation clock and the game data.

The computer can synchronize between the game machines by reading this information, as in the game machines 200 according to the second embodiment.

The information storage media 600, 800 may be any of various suitable means such as CD-ROM, DVD-ROM for reading information through a laser light, hard disc for magnetically reading information or memory.

Although the present invention has mainly be described in connection with the game system, it may be applied to any synchronization in the general networks, for example, to the synchronization in an image data distributing system.

For example, the present invention may be applied to an image data distributing system to which at least one image display machine and an image distribution machine for distributing the image data to the image display machine are connected to a transmission path, the image display machine being operated in synchronous with the image distribution machine.

In such a case, the image distribution machine may comprise a clock generation section for generating a reference clock as a basis of synchronization and a transmitter section for transmitting the generated reference clock toward the image display machine.

The image display machine may also comprise a receiver section for receiving the reference clock from the image distribution machine, and an operation clock generation section for generating an operation clock for the image display machine such that the operation clock in the image display machine is synchronized with that of the image distribution machine.

The reference clock is also set to be of a frequency lower than the operation clock, as in the reference clock 900 of the first to third embodiments.

Since the out-of-synchronization in the image display is easily found by the observer, the speed of image display must exactly be synchronized, particularly in the image display in the network.

In such an arrangement, the third embodiment can provide the same advantage as in the game system of the first embodiment. Thus, the synchronization can exactly be attained between the image display machines or between the image distribution machine and image display machine.

The present invention is effective even for the synchronization between the processing devices interconnected through the network.

The hardware components mentioned above, for example, the clock generation sections 120, 220, 530, 770, machine clock generation sections 180, 220 and clock selection sections 160, 260 may be formed by PL circuits and the like. The clock and data superposition sections 170, 270 and clock and data separation sections 172, 272 may be formed by ATM switches.

The present invention is not limited to the illustrated embodiments, but may be applied to any of various other forms.

For example, the game machine 200 may be any of various game machine forms such as arcade game machines, home game machines, portable game terminals and so on. Furthermore, the transmission path is not limited to cables such as optical fiber cables and the like, but may be of wireless type such as satellite communication path.

The technique of transmitting the clock itself is not limited to the aforementioned superposition technique, but may be realized by a newly provided signal line through which clock signals are to be transmitted.

What is claimed is:

1. A game system comprising at least one slave machine and a master machine connected to the slave machine through a transmission path, synchronization between the master machine and the slave machine being taken during operation, wherein the master machine includes:
   means for generating a reference clock to be a basis of the synchronization; and
   means for transmitting the generated reference clock to the slave machine, wherein the slave machine includes:
   means for receiving the reference clock transmitted from the master machine;
   operation clock generation means for generating a slave operation clock for the slave machine so that the slave operation clock is synchronized with a master operation clock for the master machine based on the received reference clock; and
   game means for executing a game based on the generated slave operation clock.

2. The game system according to claim 1, wherein the reference clock is set to be of a frequency lower than the slave operation clock and the master operation clock, wherein the game means includes a plurality of game execution means, and wherein the operation clock generation means generates the slave operation clock for each of the game execution means.

3. An image data distribution system comprising at least one image display machine and an image distribution machine connected to the image display machine through a transmission path, the image distribution machine distributing image data to the image display machine, synchronization between the image display machine and the image distribution machine being taken during operation, wherein the image distribution machine includes
   means for generating a reference clock to be a basis of the synchronization; and
   means for transmitting the generated reference clock to the image display machine, wherein the image display machine includes:
   means for receiving the reference clock transmitted from the image distribution machine; and
   operation clock generation means for generating a display operation clock for the image display machine so that the display operation clock is synchronized with a distribution operation clock for the image distribution machine based on the received reference clock.

4. The image data distribution system according to claim 3, wherein the reference clock is set to be of a frequency lower than the display operation clock and the distribution operation clock.

5. A game data distribution machine for distributing game data for playing a game to a plurality of game machines in which the game is played while a progressing state of the game in each of the game machines is synchronous each other, the game data distribution machine comprising;

means for generating the game data;

means for generating a reference clock to be a basis of generation speed of the game data; and means for transmitting the reference clock and the game data to the plurality of game machines, wherein, in each of the plurality of game machines, execution speed of a game is adjusted based on the reference clock and the game is played at the execution speed of the game based on the game data.

6. A game machine for playing a game with at least one other game machine while a processing state of the game in the game machine is synchronous with a processing state of the game in the other game machine, the game machine comprising means for receiving game data from a game data distribution machine for distributing the game data to the game machine and to the other game machine, and a reference clock to be a basis of clock speed from the game data distribution machine;

means for generating an operation clock of the game machine so that a clock speed of the game machine is synchronized with a clock speed of the other game machine based on the received reference clock; and means for executing the game based on the generated operation clock and the game data.

7. A game machine realizing at least one of a master function and a slave function and operating in synchronization with at least one other game machine, the game machine comprising:

means for generating a reference clock to be a basis of the synchronization when the game machine realizes the master function;

means for transmitting the generated reference clock to the other game machine having the slave function when the game machine realizes the master function;

means for receiving the reference clock from the other game machine having the master function when the game machine realizes the slave function;

operation clock generation means for generating an operation clock based on the reference clock; and game means for executing the game based on the generated operation clock.

8. The game machine according to claim 7, wherein the reference clock is set to be of a frequency lower than the operation clock, wherein the game means includes a plurality of game execution means, and wherein the operation clock generation means generates the operation clock for each of the game execution means.

9. The game machine according to claim 7, wherein the game machine realizes the master function when the game machine starts prior to the other game machine, and realizes the slave function when the game machine starts after the other game machine.

10. A game machine realizing at least one of a master function and a slave function and operating in synchronization with at least one other game machine, the game machine comprising:

circuit for generating a reference clock to be a basis of the synchronization when the game machine realize the master function;

circuit for transmitting the generated reference clock to the other game machine having the slave function when the game machine realizes the master function;

circuit for receiving the reference clock from the other game machine having the master function when the game machine realizes the slave function;

operation clock generating circuit for generating an operation clock based on the reference clock; and game circuit for executing the game based on the generated operation clock.

11. A game machine usable in a network to which a plurality of game machines are connected through a transmission path designed to transmit data with a predetermined transmission interval, the game machine operating in synchronization with at least one other game machine, the game machine comprising:

means for receiving game data for playing a game, with the transmission interval;

means for generating an operation clock based on the transmission interval; and means for executing the game based on the generated operation clock and the game data.

12. A computer-usable information embodied on an information storage medium or in a carrier wave, for distributing game data for playing a game to a plurality of game machines while a progressing state of the game in each of the game machines is synchronous each other, the information comprising information for realizing means for generating the game data;

means for generating a reference clock to be a basis of generation speed of the game data; and means for causing transmission means to transmit the reference clock and the game data to the plurality of game machines, wherein, in each of the plurality of game machines, execution speed of a game is adjusted based on the reference clock, and the game is played at the execution speed of the game based on the game data.

13. Computer-usable information embodied on an information storage medium or in a carrier wave, for a computer playing a game with at least one game machine while a progressing state of the game in the computer is synchronous with a progressing state of the game in the game machine, the information comprising information for realizing:

means for causing receiving means to receive game data distributed from a game data distribution machine distributing the game data to the game machine for playing the game, and a reference clock to be a basis of clock speed;

means for generating an operation clock of the computer so that a clock speed of the computer which uses the computer-usable information is synchronized with a clock-speed of the game machine based on the received reference clock; and means for executing the game based on the generated operation clock and the game data.

14. Computer-usable information embodied on an information storage medium or in a carrier wave, for a computer realizing at least one of a master function and a slave function and operating in synchronization with at least one game machine, the information comprising information for realizing:

means for generating a reference clock to be a basis of the synchronization when the computer realizes the master function;

means for causing transmission means to transmit the generated reference clock to the game machine having the slave function when the computer realizes the master function;

means for causing receiving means to receive the reference clock sent from the game machine having the master function when the computer realizes the slave function;

operation clock generation means for generating an operation clock based on the reference clock; and game means for executing the game based on the generated operation clock.

15. Computer-usable information embodied on an information storage medium or in a carrier wave according to claim 14, wherein the reference clock is set to be of a frequency lower than the operation clock.

16. Computer-usable information embodied on an information storage medium or in a carrier wave, being used in a network to which a computer and at least one game machine are connected through a transmission path designed to transmit data with a predetermined transmission interval and for synchronizing with the game machine, the information comprising information for realizing:

means for causing receiving means to receive game data for playing a game, with the transmission interval;

means for generating an operation clock based on the transmission interval; and means for executing the game based on the generated operation clock and the game data.

* * * * *